United States Patent [19]

Hradel

[11] 4,273,191
[45] Jun. 16, 1981

[54] SIMULTANEOUS OIL RECOVERY AND WASTE DISPOSAL PROCESS

[76] Inventor: Joseph R. Hradel, 6482 S. Mission Rd., Mount Pleasant, Mich. 48858

[21] Appl. No.: 123,940

[22] Filed: Feb. 25, 1980

[51] Int. Cl.$^3$ .................. C10G 1/04; E21B 43/22; E21B 43/267

[52] U.S. Cl. .................. 166/305 R; 166/275; 166/307; 166/308; 166/312; 208/11 LE; 252/8.55 R; 252/8.55 B; 252/8.55 D; 252/331

[58] Field of Search .............. 166/271, 272, 273, 274, 166/275, 303, 304, 305 R, 308, 312; 208/11 LE; 252/8.55 B, 8.55 D, 331

[56] References Cited

U.S. PATENT DOCUMENTS

| | | | |
|---|---|---|---|
| 1,823,440 | 9/1931 | DeGroote et al. | 252/8.55 D |
| 3,629,105 | 12/1971 | Weiss | 252/8.55 B |
| 3,766,077 | 10/1973 | Hwa et al. | 252/8.55 B X |
| 3,849,328 | 11/1974 | Schievelbein | 252/8.55 B X |
| 4,157,115 | 6/1979 | Kalfoglou | 166/274 |

OTHER PUBLICATIONS

Shreve, Norris R., *Chemical Process Industries,* Third Edition, 1967, McGraw-Hill, Inc., pp. 626, 628, 635–638.

*Primary Examiner*—Stephen J. Novosad
*Assistant Examiner*—George A. Suchfield
*Attorney, Agent, or Firm*—C. Kenneth Bjork

[57] ABSTRACT

A process for recovering oil from oil containing masses and formations by contacting such oil bearing masses with waste foul condensates, known as black liquor, from paper and pulping operations, thereby to free the oil present or bound up in such masses and simultaneously provide a use for the heretofore considered unusable black liquors, the disposal of which up to now have presented both an economical and ecological problem.

8 Claims, No Drawings

SIMULTANEOUS OIL RECOVERY AND WASTE DISPOSAL PROCESS

BACKGROUND OF THE INVENTION

1. Field of the Invention

The present invention relates to a novel method for effecting recovery and production of oil from oil containing masses and formations by contacting such masses or formations with foul condensates; i.e., black liquors, from paper and pulping operations thereby unexpectedly freeing the oil present in and/or bound up in such masses. The process is particularly effective and suitable for stimulating the production and recovery of oil from earth formations and strata wherein paraffinic deposits permeate and clog the fissures and channels in the formation thereby reducing or even stopping the flow of oil towards a well bore.

2. Description of the Prior Art

The technical and patent literature is replete with descriptions of processes and procedures for stimulating the recovery of oil from oil bearing masses and formations. Hydraulic fracturing techniques, both with and without the use of propping agents, in which a pumpable aqueous liquid is forced under pressure into a formation to generate new fissures and enlarge existing ones are standard practice. Water is the principal fluid used in such operations.

Primary and secondary water drives for forcing oil through fissures towards boreholes of wells are well established procedures for recovering oil from fields in which primary production has dropped below levels conducive to economic recovery.

The use of mineral acids, particularly inhibited hydrochloric acid, has been practiced for many years in the cleaning and finishing of wells following completion of drilling operations.

Currently employed techniques for keeping oil bearing formations free from fissure clogging paraffins involve the use of carbon tetrachloride or carbon disulfide as deparaffining agents. These procedures require the handling and pumping of large quantities of the agents which have been shown by recent studies to be carcinogens. Additionally, carbon tetrachloride for many years has been known to cause irreversible liver damage when its fumes are brought into the human body. Because of these deterrents to human health, it can be expected that their use in such operations may well be stopped through regulatory means.

Much time, effort and enormous sums of money are being spent in an effort to utilize underground, in situ fire drives or retorting techniques on oil shales and tar sands to obtain oil values therefrom. Steam treatment and retorting of these materials in above ground plants also is being investigated, but neither of these techniques has proved to be either technically nor economically practical to date in pilot or large scale operations.

Waste foul condensates, commonly called black liquors because of their dark color, result as an undesirable waste by-product from paper mill operations, both kraft and non-kraft. Generally, these liquors are the condensate from evaporators and surface condensors associated with pulp digesters. These liquors heretofore have had no recognized use and their disposal in itself has been and continues to be an ever increasing problem. In the past, these liquors have been diverted into streams, rivers and lakes where they have given an undesirable dark color to the water body, imparting an objectionable odor and taste to the water and tainted the flesh of the fish and other edible life inhibiting such lakes, rivers and streams. Recent strengthening of environmental impact regulations has placed an ever increasing burden on mill operators to legally and properly dispose of such waste liquors by other means.

Blackwell, MacKay, Murray and Oldham, "Review of Kraft Foul Condensates", Tappi Vol. 62, No. 10, October 1979, summarizes the sources, quantities, chemical composition and environmental effects of such liquors and presents an extensive bibliography of the published literature about such waste liquors and the problems they present, particularly when the liquors are introduced into fresh water bodies and streams for disposal.

More recently, in the United States, mills have been recycling the black liquors which contain about 35 percent organics to cookers until the liquors are condensed to a mass containing about 65 percent organics with the balance being inorganic matter and residual water. This mixture then ordinarily is subjected to combustion on a fluidized bed to remove the organic matter but this process of waste disposal has been beset with problems.

Applicant is unaware of any literature or patent publications in any way related to or suggesting any practical use of waste foul condensates; and, in particular, for effecting oil recovery from oil bearing masses.

SUMMARY OF THE INVENTION

In general, the novel process of the present invention comprises treating an oil bearing mass with a black liquor, the liquor being employed in an amount sufficient to solubilize or otherwise chemically dissolve or affect those materials and components of the mass which bind or hold the oil present therein, thereby freeing the oil and enabling it to flow through or be separated from the mass and readily be recovered.

In the practice of the present invention, a black liquor is brought into intimate contact with or forced through an oil bearing mass at atmospheric or superatmospheric pressure. The quantities of liquor employed commonly are well in excess of that actually required to achieve the freeing of the oil from the mass, particularly in treating oil bearing formations. This practice is employed to take advantage of the fracturing effect achieved simultaneously when the liquor is pumped or otherwise forged into the formation or strata. If desired, sand or other particulate solids can be added to the liquor. Such materials, as is recognized by one skilled in the art, will serve as propping agents to hold open the fissures generated by the fracture fluid. This offers the additional advantage that more of the strata surface can be more readily reached by the liquor for action by the active components.

Some oil freeing action is realized when any quantity of the active components in the liquor contact the oil bearing mass. However, because of the favorable economics accompanying the use of the waste black liquors, conveniently volumes containing quantities of the active components in excess of that required to free up the oil are used to take advantage of the self-fracturing of the formation simultaneously realized. This excess has no detrimental affect on the oil or its releasability from the mass carrying it.

The term "oil bearing mass" as used herein is meant to include waste oil containing emulsions from machining and other operations, conventional oil-containing earth formations and strata being readied for primary oil production or being subjected to secondary or tertiary water drives, oil shales, tar sands and other liquid, semi-solid or solid oil containing masses which lend themselves to large-scale commercial oil recoveries or oil generation.

Black liquor produced from paper pulping operations generally contain from about 300 to 400 kilograms of organic components per metric ton (Kg/M.T.) of condensate, and on the average about 350 kilograms per metric ton. Typically, these components comprise a multiplicity of alcohols (about seven different species), ketones (about six), in the neighborhood of twenty terpenes, approximately seven organic sulfur compounds, about ten phenolic compounds, as many as five organic acids, about six organic gases plus several other organic materials such as furans, toluene and other aralkyl hydrocarbons, and liquid hydrocarbons ranging from $C_{10}$ to $C_{16}$ in carbon content. The actual number and types of these components in a given black liquor may vary somewhat from the typical composition described herein, depending on the origin of the pulp and the nature and condition of pulp treatment and digestion. However, in general, the black liquor are comprised of a composition approximating that described herein.

These components which make up the solute or suspended matter in admixture in the aqueous based black liquor are too difficult to economically separate or recover and heretofore have not been usefully employed. In fact, as set forth in the description of the prior art, the disposal of this by-product waste liquor has been and continues to increasingly be a problem to the paper mills.

Now, unexpectedly, I have discovered that the components of black liquor provide a unique blend and composition of active ingredients which in combination bring about surfactant, solubilizing, detergent and acidizing effects on both paraffinic and non-paraffinic oil containing masses and clogged formations to fluidize heavy crude, paraffinic hydrocarbons, solubilize through acidic dissolution limestone formations, and free up through detergent and surfactant action oils present in oil-water emulsions.

By the practice of the present invention a number of distinct advantages and uses are realized. The costly black liquor disposal problem for paper mills can be eliminated and enhanced crude oil production readily can be realized from our national oil reserves and other oil bearing wastes; thus, solving a problem for the paper industry, the oil industry and the Department of Energy. Further, in these times of energy crises because of our dependency on foreign oil and ever-increasing costs of doing business from regulations and controls imposed restricting the use of known carcinogens and the carefully watched disposal of wastes, the practice of the present invention offers a single operable solution to a number of major problems.

DESCRIPTION OF PREFERRED EMBODIMENTS

In one preferred embodiment of the present invention, a black liquor is injected, as by pumping under high pressure with mechanical high pressure pumps or by hydraulic force or gas pressure, into a paraffinic clogged, oil-bearing formation through a well bore. Generally, the liquor is pumped into the formation at a pressure sufficient to fracture the formation and in a volume calculated to achieve fracturing a desired distance away from the box. The liquor can have added thereto, if desired, sand to serve as a propping agent.

The quantity of pressure to be used in the pumping action to achieve formation fracture readily is calculated knowing the depth of injection. The minimum pressure required is that calculated to lift the earth cap between the injection site and surface.

An advantageous facet of the present invention resides in the fact that in such fracturing operations the quantity of liquor employed is such that the amount of the active components present therein which affect the work formation, paraffinic solids and the like oil binding agents as described fully hereinbefore is more than sufficient to physically or chemically react with these to free the oil for recovery.

A second advantage of this invention is that the present process provides a useful, productive and economically rewarding means to dispose of large volumes of paper mill waste black liquor streams.

In another preferred embodiment of the present invention, black liquor is injected into a non-paraffinic clogged formation in a manner similar to that set forth directly hereinbefore. In this treatment, fracture of the formation is achieved, with simultaneous dissolution of limestone to provide enlarged fissures for oil flow.

In still another preferred embodiment, black liquor itself is used as the sole driving fluid in secondary oil recovery or as an additive to the aqueous drive fluid ordinarily employed in such operations. This process not only achieves oil recovery from the water sweep, but increased quantities over that expected are obtained because of the detergent and solvent action from the active components present in the liquor.

In still another preferred embodiment, oil shale or tar sands from surface deposits are dug, and in the case of shales preferably crushed, and placed in contact with a volume of black liquor in excess of that of the oil bearing mass. Oil readily is released from the solids; this floats to the surface and is removed by conventional separatory techniques. Good oil recovery is obtained with or without stirring or agitation of the liquid solid mixture.

In this latter embodiment, it is recognized that following the oil recovery operation, a quantity of residual process liquid will remain. (Ths same is found if the process of the present invention is employed to recover oil from oil-water emulsions or other oil containing solid and liquid masses.) However, even in these instances there is an advantage in that in the oil recovery process, at least a portion of the active ingredients have reacted or otherwise physically or chemically entered into action with the oil bearing mass. Thus, the nature of the black liquor is changed in a positive manner to provide for more ready disposal by conventional means. In fact, one convenient way is to take the residual liquid-solid mass remaining after the freed oil has been removed and solidify it by evaporation with gums or resins to provide a readily storable solid waste, which could be used for construction fill or other land reclamation uses.

The most preferred embodiments of the present invention are those which the liquor is injected into underground oil shale or other oil bearing formations, particularly paraffinic clogged strata, as these also provide for simultaneous disposal of the excess liquor while promoting fracturing of the formation and recovery of oil.

The following non-limiting examples further illustrate the present invention.

EXAMPLE 1

A substantially cylindrical hard packed core sample, about 10 centimeters in diameter and 5 centimeters long, from an oil bearing formation was placed in a 1½ liter vessel. About 1 liter of a black liquor from a non-kraft pulping operation having about 10 percent solute was placed in the vessel. No agitation was employed. Almost immediately the core started disintegrating and oil floated to the surface. Within several days the core had substantially completely disintegrated, all the oil contained therein having floated to the surface where it easily was removed by skimming. Subsequent separation of the residual aqueous liquid from the remaining dispersed solid followed. Examination of these solids showed this material to be substantially inorganic in nature. Due to the individual character of oils (crude), formation densities, formation temperature and formation chemical composition; the concentration and amounts of black liquor to be used in a given operation will be determined for each operation since this factor will, of necessity, be optimized for each individual case.

EXAMPLE 2

The procedure of Example 1 was repeated except that a hard packed oil shale core was used as the oil bearing mass. Oil again almost immediately floated to the surface as the liquor was added to the vessel; and, within minutes, the core had disintegrated with the oil being freed therefrom. In a control study, a similar core was placed in the vessel and similar quantity of water added. No activity or disintegration of the core was observed even after an extended period of time. The only displacement of product realized was a small amount of displaceable surface oil or hydrocarbon materials with no apparent penetration of the core.

I claim:

1. In a process for recovering oil from an oil bearing mass, by treating the mass with an aqueous liquid, the improvement which comprises treating said mass with a black liquor, thereby effecting the release of oil from said mass.

2. The process as defined in claim 1 wherein the oil bearing mass is a paraffinic containing oil bearing formation.

3. The process as defined in claim 1 wherein the oil bearing mass is an oil bearing earth formation and the black liquor is injected under pressure into said formation, thereby fracturing said formation and generating fissure therein to achieve primary recovery of crude petroleum oil therefrom.

4. The process as defined in claim 3 wherein the black liquor has sand added thereto, said sand serving as propping agent for said fissure.

5. The process as defined in claim 1 wherein the oil bearing mass is a formation being subjected to an aqueous fluid drive secondary oil recovery operation and the aqueous fluid comprises black liquor.

6. The process as defined in claim 1 wherein the oil bearing mass is an oil shale.

7. The process as defined in claim 1 wherein the oil bearing mass is a tar sand.

8. The process as defined in claim 1 wherein the oil bearing mass is an oil-water emulsion.

* * * * *